June 29, 1965 W. KOHLHAGEN 3,191,702
WEIGHING DEVICE OF SPRING-BALANCE TYPE
Filed June 18, 1963
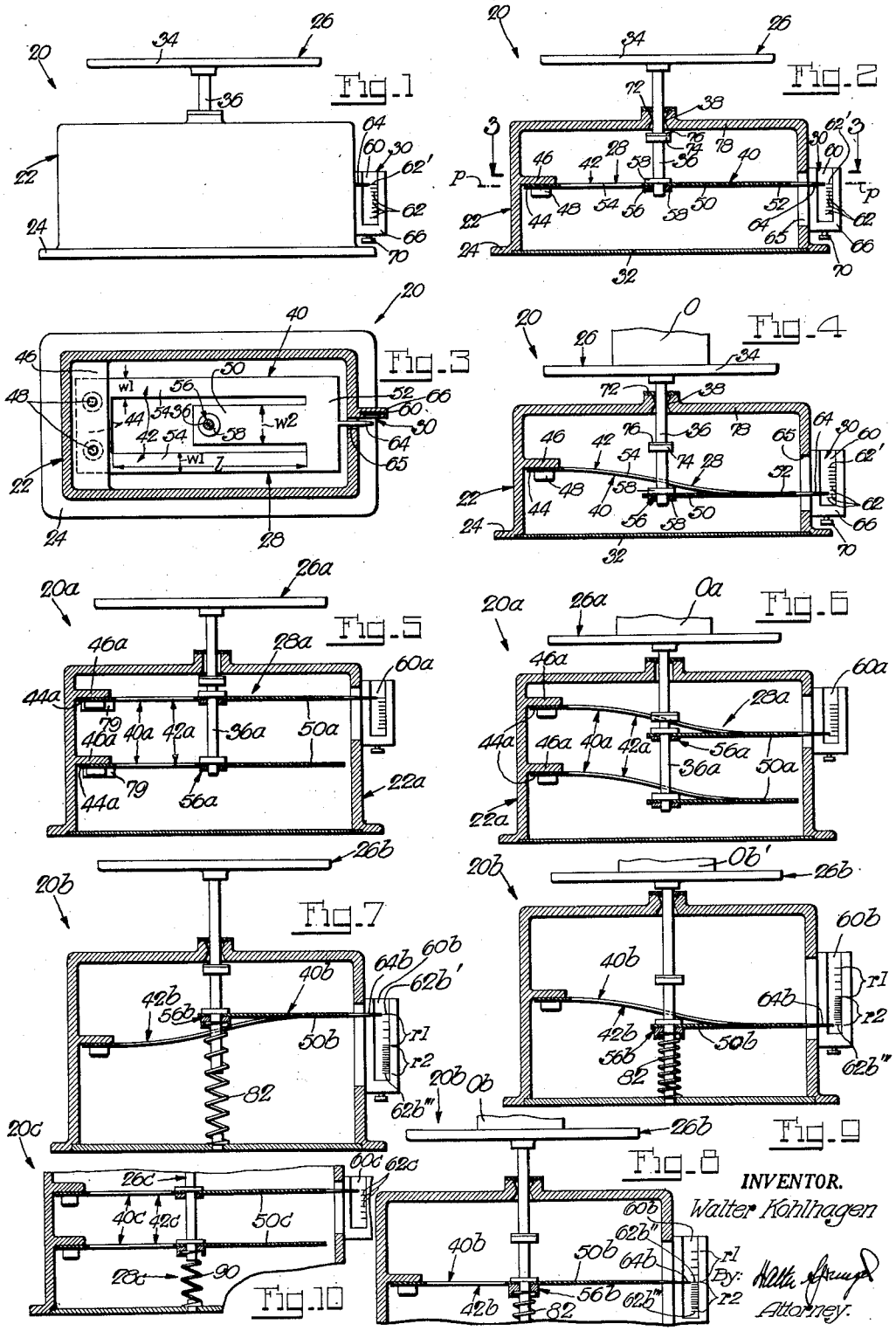
INVENTOR.
Walter Kohlhagen
By: [signature]
Attorney

United States Patent Office 3,191,702
Patented June 29, 1965

3,191,702
WEIGHING DEVICE OF SPRING-BALANCE TYPE
Walter Kohlhagen, 818 Oakley Ave., Elgin, Ill.
Filed June 18, 1963, Ser. No. 288,817
12 Claims. (Cl. 177—229)

This invention relates to weighing devices in general, and to weighing devices of spring-balance type in particular.

It is among the objects of the present invention to provide a weighing device of spring-balance type which is not only more reliable and accurate in its performance, but also of quite considerably simpler construction and accordingly lower cost, than prior weighing devices of this type.

It is another object of the present invention to provide a weighing device of this type having load and spring balance units of which the load unit may respond to a weight thereon in simple conventional depression, and the spring unit has as its sole or major component at least one simple resiliently flexible leaf member which is fixedly mounted with one end and by direct engagement with the load unit responds to weight depression of the latter in flexure of increasingly opposing and finally balancing force, with the displacement of the leaf member at its engagement with the load unit being preferably exactly proportional to any weight on the load unit at balancing deflection of the leaf member, so that such displacement of either the load unit or leaf member may by a suitable pointer arrangement indicate on a uniformly graduated scale the exact weight of any object being weighed.

It is a further object of the present invention to provide a weighing device of this type of which the aforementioned leaf member is at its free end provided with a rigid action arm on which the load unit rests and which is so arranged that the leaf member will respond to weight depression of the load unit in such flexure that the ensuing follower motion of the action arm is linear and non-tilting despite the flexure of the lead member, whereby the action arm may advantageously be connected with the load unit and additionally function as one of a minimum of two guides for the latter. This is achieved by arranging the leaf member so that it extends in non-flexed condition preferably in a plane normal to the direction of depression of the load unit, and the action arm extends from the free end of the leaf member rearwardly toward the mounted end thereof, so that the leaf member will respond to weight depression of the load unit in compound S-like flexure, with the connection between the action arm and load unit being preferably exactly midway of the flexible length of the leaf member in order that the linear displacement of this connection under any weight on the load unit and at balancing flexure of the leaf member will be exactly proportional to such weight for the aforementioned purpose of accurate weight indication on a fixed scale.

Another object of the present invention is to provide a weighing device of this type of which the aforementioned leaf member and action arm preferably lie in one and the same plane in non-flexed condition of the leaf member, with the leaf member and its action arm being advantageously formed in a single piece by simple blanking from resilient metal plate stock, and the action arm being kept rigid for its intended function by making the same of adequate width for the purpose.

A further object of the present invention is to provide an alternative weighing device of this type of which the spring unit consists of two, or even more, leaf members which may be exactly like the aforementioned leaf member and are spaced from each other so that they alone may guide the load unit of the device on its weight-depressing motion. With this arrangement, the weight of an object being weighed, as indicated by the ensuing depression of the load unit from its zero-load position, corresponds to the combined balancing flexure of the leaf members, and the load unit is on its weight depression guided solely by the leaf members not only free from any friction but also so that the load unit will not tilt in the slightest despite the inevitable, though negligible, creep of the same laterally of its direction of depression ensuing from operative flexure of the leaf members. This arrangement also points at the further feasibility of providing for ready disconnection of the load unit from, and its equally ready reconnection with, one or more of the leaf members, thereby to provide in one and the same weighing device a plurality of selective weighing ranges of different upper weight limits which are preferably marked individually on the same indicating weight scale, with that range being advantageously selected within which a particular object being weighed causes the largest depression or displacement of the load unit for most accurate indication of the object's weight on the corresponding part of the weight scale.

It is another object of the present invention to provide another alternative weighing device of this type of which the load unit denotes over an initial part of its weight depression range weight units from zero to a given initial top weight, and denotes over the remaining part of its weight depression range weight units from this initial top weight to a final top weight which is a multiple of that of the initial top weight, with the weight indicating scale being marked with progressive corresponding weight units and top weights. The device thus permits close-weighing at considerable accuracy of objects which in weight may vary from very light all the way to comparatively quite heavy. This is achieved by providing the spring unit of the device with an additional spring which under no-load condition of the load unit normally deflects the leaf member opposite to its operational deflection under a weight on the load unit, with this additional spring acting on the leaf member or load unit at their connection and being calibrated to hold the leaf member at such normal deflection within the permissible maximum magnitude of its balancing flexure.

Other objects and advantages will appear to those skilled in the art from the following, considered in conjunction with the accompanying drawings.

In the accompanying drawings, in which certain modes of carrying out the present invention are shown for illustrative purposes:

FIG. 1 is a spring-balanced weighing device embodying the present invention;

FIG. 2 is a vertical section through the device;

FIG. 3 is a horizontal section through the device as taken on the line 3—3 of FIG. 2;

FIG. 4 is a section similar to FIG. 2, but showing the device in action, indicating the weight of an object placed thereon;

FIG. 5 is a vertical section through a spring-balanced weighing device embodying the present invention in a modified manner;

FIG. 6 is a section similar to FIG. 5, but showing the modified device in action, indicating the weight of an object placed thereon;

FIG. 7 is a vertical section through a spring-balanced weighing device embodying the present invention in another modified manner;

FIGS. 8 and 9 are sections similar to FIG. 7, but showing this further modified device in action, indicating the different weights of objects placed thereon; and FIG. 10 is a fragmentary vertical section through a spring-balanced weighing device embodying the present invention in a further modified manner.

Referring to the drawings, and more particularly to FIGS. 1 to 4 thereof, the reference numeral 20 designates a weighing device which comprises a casing 22 with a base 24, companion load and spring balance units 26 and 28, and a weight indicator 30. The casing 22 is, for ready assembly of the device, preferably open at its bottom and normally closed thereat by a cover plate 32 which may be removably mounted in any suitable manner.

The load unit 26 is in this instance in the simple form of a platform 34 with a depending action bar 36 which directly cooperates with the spring balance unit 28, called "spring unit" for brevity. The load unit 26 is, for its operating motion in exemplary vertical direction, guided with its action bar 36 in a bearing 38 in the casing 22 and in this instance also by the spring unit 28.

The spring unit 28 is, in accordance with an important aspect of the present invention, in the form of a reed element 40, having a longitudinal arm 42 which is resiliently flexible and fixedly mounted with one end 44 on a rib formation 46 in the casing 22 as at 48, and a rigid action arm 50 which extends from the other, free end 52 of the flexible arm 42 toward the mounted end 44 thereof. The flexible arm 42 is, and acts as, a leaf spring which in this instance is divided into two spaced parallel companion parts 54, with the rigid action arm 50 extending between the spring parts 54 (FIG. 3). The leaf spring 42, when in non-flexed condition, preferably extends in a plane $p$ which in the mounted condition of the spring is substantially horizontal owing to the hereinafter explained direct operating response of this spring to exemplary vertical displacement of the load unit 26 under the weight of an object thereon. Preferably also, the rigid action arm 50 is coplanar with the leaf spring 42 in non-flexed condition of the latter. The load unit 26 is with its action bar 36 operatively connected at 56 with the rigid action arm 50 of the spring unit 28. The operative connection 56 between the action bar 36 and action arm 50 is in this instance formed by fixed collars 58 on the action bar which are in engagement with the action arm, with the lower end of the action bar extending through a hole in the action arm (FIG. 2). The load unit 26 thus rests on the action arm 50 of the spring unit 28 in any event, and by the extension of its action bar 36 through the action arm 50 of the spring unit is also guided by the latter in its operational vertical motion so that the described additional single bearing 38 in the casing 22 suffices for proper guidance of the load unit. The operative connection between the action bar 36 of the load unit 26 and the action arm 50 of the spring unit 28 is between the ends 44 and 52 of the leaf spring 42 so that the latter will respond to the weight of an object O on the load unit in compound S-like flexure in a plane normal to the plane $p$ and of a magnitude corresponding to the particular weight of the object O (FIG. 4). On removing the object O from the load unit 26, the spring unit 28 will recover and return the load unit to the no-load position (FIG. 2).

The present weighing device is also automatic in its action in that it indicates the weight of any object placed on the load unit. To this end, the vertical displacement of the load unit 26 under the weight of an object thereon is read against an appropriately graduated scale 60 the graduations 62 of which denote weight units. This is achieved in the present example by providing on the free end 52 of the spring unit 28 an extension in the form of a pointer 64 which extends through a slot 65 in the casing 22 and cooperates with the scale 60 in a holder 66 on the casing.

With the leaf spring 42 of the spring unit 28 responding to an object on the load unit 26 in compound S-like flexure as described, it stands to reason that the ensuing vertical displacement of the action arm 50 is accompanied by an inevitable component creep in its plane toward the mounted end 44 of the spring unit which, while so small as to be negligible, nevertheless tilts the load unit in its bearing 38 ever so slightly. To avoid even the slightest binding of the thus tilting load unit in its bearing 38, the latter is preferably machined to have line contact, more or less, with the action bar 36 of the load unit so as to lend the latter adequate freedom for its insignificant operational tilting.

While the spring unit 28 is shown in non-flexed condition in the no-load position of the load unit 26 in FIG. 2, the spring unit is in reality then already flexed, very slight and hardly perceptible as it may be, as will be readily understood. To compensate for such initial flexure of the spring unit 28 in the no-load position of the load unit 26 in any event, the scale 60 is preferably adjustable in its holder 66 by a screw 70, for example, so as to align the zero-weight graduation 62′ with the pointer 64 in the no-load position of the load unit.

The preferred flat spring unit 28 is conveniently and advantageously blanked in a single piece from resilient metal plate stock of uniform thickness, with the widths $w1$ and $w2$ of the spring leaf parts 54 and the action arm 50 (FIG. 3) being selected to have the required operational resilient flexibility and rigidity, respectively. Preferably also, the spring leaf parts 54 are of identical configuration so as to induce on their flexure no torsional stresses in the action arm 50.

It is preferred to arrange the spring unit so that the flexure of its leaf spring varies linearly with different weights on the load unit. This is achieved by keeping the leaf spring 42 at uniform thickness as well as uniform width throughout its effective length $l$ and locating the connection 56 between the load and spring units 26 and 28 exactly midway of the effective length $l$ of the leaf spring 42, with the exemplary leaf parts 54 of the latter being of identical widths $w1$ (FIG. 3) to comply with the uniform width requirement of the leaf spring. With the spring unit 28 thus arranged for flexure of a magnitude which varies linearly with different weights on the load unit 26, the graduations 62 on the scale 60 are advantageously spaced equally from each other and all graduations, except the zero graduation 62′, denote multiples of the same weight unit.

To prevent excessive, damaging flexure of the spring unit 28 accidentally or by placing an excessive weight on the load unit, the bearing 38 in the casing 22 preferably has on the outside a felt or the like washer 72 on which the platform 34 of the load unit comes to rest before excessive flexure of the spring unit can occur. Preferably also, the action bar 36 of the load unit 26 is provided with a stop collar 74 having a felt or the like washer 76 thereon which on the rise of the load unit beyond its no-load position (FIG. 2) from any cause whatever will engage the top wall 78 of the casing 22 and stop the load unit before any damage to the spring unit can possibly occur.

With the spring unit 28 arranged in the described preferred manner, i.e., with the leaf spring 42 being of uniform width and thickness throughout and the action arm 50 being rigid and having its connection 56 with the load unit 26 exactly midway of the flexible length of the leaf spring 42, any deflecting force on the leaf spring in consequence of a weight on the load unit will set up in the leaf spring at its juncture with the action arm two moments of couples which are of identical magnitude but of opposite sign and, hence, balance each other, with the unique result that the action arm 50 will extend in a plane parallel to the plane $p$ (FIGS. 2 and 4) throughout the operating range of the leaf spring. This, coupled with the surprising discovery that the leaf spring in its compound S-like flexure response to a weight on the load unit has deflection which varies linearly with the force applied thereto to an exceedingly high degree of accuracy, explains why the instant weighing device is of exceeding accuracy in its weight determination and indication.

Reference is now had to FIGS. 5 and 6 which show a modified weighing device 20a that differs from the described weighing device 20 in that the spring unit 28a is comprised of a plurality, in this instance two, reed elements 40a which may be identical and be exactly like the reed element 40 of FIG. 3. The reed elements 40a are in this instance arranged in parallel side-by-side relation and fixedly mounted with their adjacent ends 44a on the rib-formations 46a in the casing 22a, with the non-fixed leaf springs 42a of the reed elements extending in spaced parallel planes (FIG. 5). The action bar 36a of the load unit 26a is at 56a connected with the action arms 50a of both leaf springs midway of the flexible lengths of the latter, wherefore these action arms solely guide the load unit 26a in its operational movements. This has the advantage that operation of the weighing device is totally without friction and the load unit 26a does not have any tilting component in its operational movements. Of course, with the present multiple reed arangement the weight of an object Oa on the load unit 26a is proportional to the displacement or depression of the load unit as determined by the balancing flexures of the leaf springs 42a (FIG. 6), with the weight scale 60a being graduated accordingly. Provisions may also be made to compensate for excessive tolerances in the location of the connection 56a between the load unit 26a and the action arm 50a of either leaf spring 42a midway of the length of the latter so that such connection will nevertheless be exactly midway of the effective length of the leaf spring. To this end, there may be provided on the rib formations 46a in the casing 22a adjustable eccentrics 79 (FIG. 5) by means of which to regulate the effective lengths of the leaf springs.

Reference is now had to FIGS. 7 to 9 which show another modified weighing device 20b of a type that has in its operation different weighing ranges, this by virtue of the combined action of a reed element 40b and an additional spring 82. Thus, the spring 82, which is of exemplary compression type and designed so that its deflection varies linearly with a compressive force applied thereto, bears against the action arm 50b on the leaf spring 42b at its connection 56b with the load unit 26b and in the no-load position of the load-unit (FIG. 7) holds the leaf spring flexed, preferably at the maximum permissible magnitude of its balancing flexure, at which the pointer 64b is opposite the zero-weight graduation 62b' on the weight scale 60b. The leaf spring 42b is thus held flexed to one side of its plane in non-flexed condition which is opposite to that to which it would be flexed by a weight on the load unit if the spring 82 were absent. On placing an object Ob on the load unit 26b (FIG. 8) the spring 82 will be compressed as the leaf spring 42b recovers, with the exemplary weight of the object Ob being such that it is balanced by the compression of the spring 82 just at the point of complete recovery of the leaf spring 42b. It is at this point where the initial weighing range r1 ends, with the pointer being opposite the top weight graduation 62b'' (FIG. 8). Since over this initial weighing range r1 the flexure of the leaf spring 42b decreases at the same rate at which the flexure of the spring 82 increases, it is obvious that within the weight range r1 the weight of any object on the load unit 26b is directly proportional to the magnitude of flexure of the leaf spring 42b within its permissible maximum magnitude if the leaf spring were the sole spring of the spring unit 28b and the spring 82 absent. Thus, while the leaf spring 42b has fully recovered on weighing the object Ob (FIG. 8), the weight of the latter is proportional to the indicated magnitude of deflection of the spring 82 which in this example is equal to the permissible maximum magnitude of deflection of the leaf spring 42b, and the weight of this object may for simplicity of description be assumed to be one certain weight unit U as denoted by the top-weight graduation 62b'' of the weighing range r1.

On placing on the load unit 62b an object Ob' which is heavier than the object Ob in FIG. 8, its weight will lie within the larger weighing range of the device and indicated within a corresponding weighing range r2 on the weight scale 60b. This larger weighing range r2 starts at the top-weight graduation 62b'' of the initial weighing range r1 and ends with the top-weight graduation 62b''' which denotes a weight of an object on the load unit at which the flexure of the leaf spring 42b is in this example at its maximum permissible magnitude. Thus, on placing the object Ob' on the load unit 26b (FIG. 9), the compression spring 82 and leaf spring 42b will in consequence be flexed, with the weight of the object being proportional to the magnitude of flexure of the spring 82 from its initial no-load condition in FIG. 7 plus the magnitude of flexure of the leaf spring 42b from its non-flexed condition in FIG. 8. Accordingly, with the exemplary weight of the object Ob' being equal to the top weight of the larger weighing range of the device, as indicated by alignment of the pointer 64b with the top-weight graduation 62b''' of the range r2 on the weight scale 60b, the total magnitude of the flexure of the compression spring 82 and leaf spring 42b is three times the maximum permissible magnitude of flexure of the leaf spring, meaning that the exemplary weight of the object Ob' is three times the exemplary weight of the object Ob in FIG. 8, i.e., equal to three times the aforementioned weight unit U. Thus, the weight increase over any given fraction of the weighing range r2 is in this example three times the weight increase over the same fraction of the weighing range r1, wherefore the present device is advantageous in that it permits close-weighing of very light objectings within the weighing range r1 and of comparatively much heavier objects within the weighing range r2.

Reference is finally had to the further modified weighing device 20c of FIG. 10 in which two reed elements 40c are arranged similarly as in FIG. 5, with this important difference, however, that the reed elements 40c are applied primarily for their frictionless guidance of the load unit 26c in its operational movements, with a separate spring 90 being the load balancing spring proper of the spring unit 28c. To this end, the reed elements 40c may be exactly like the reed element 40 of FIG. 3, except that the leaf springs 42c have optimum resiliency at which their action arms 50c may still be sufficiently wide to have the requisite operational rigidity on blanking the reed elements 40c from resilient metal plate stock of minimum gauge. Thus, the leaf springs 42c have a resiliency which is greatly in excess of that at which they could function as the load balancing unit of the device in the absence of the spring 90. Nevertheless, as highly resilient as these leaf springs are, they inherently participate in the load-balancing function of the spring unit 28c to a slight, more or less, extent, and this is, of course, compensated for in the graduations 62c on the weight scale 60c.

The several forms of the weighing device described herein suggest further modifications thereof which need not be described. Also, while the devices described herein are stated to be weighing devices, they obviously can be used to determine the magnitude of forces.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a weighing device, the combination of a movable load unit; a stationary support; and a balancing spring unit having a longitudinal element fixedly mounted with one end on said support; and provided at its other end with an action arm, of which said element is resiliently flexible in a first plane and when non-flexed extends substantially in a second plane normal to said first plane, and said action arm is rigid and extends from said other end of said element toward but short of said one end thereof, with said load unit being guided for movement substantially normal to said second plane and resting on said action arm at a distance from said other end of said element, so that said element will respond in compound S-like flexure to a weight on said load unit.

2. In a weighing device, the combination with a movable load unit and a stationary support, of a balancing spring unit having a longitudinal leaf spring fixedly mounted with one end on said support and provided at its other end with an action arm, of which said leaf spring is of uniform width and thickness throughout and in non-flexed condition extends in a first plane and is resiliently flexible in another plane normal to said first plane, and said action arm is rigid and extends from said other end of said leaf spring toward said one end thereof; and spaced members guiding said load unit for movement substantially normal to said first plane, with said load unit resting on said action arm midway between the ends of said leaf spring, whereby said leaf spring will respond in compound S-like flexure to any weight on said load unit with the ensuing operational displacement of said action arm being proportional to said weight, and said action arm will in non-displaced and all operationally displaced conditions assume parallel dispositions.

3. The combination in a weighing device as set forth in claim 2, in which said action arm is in said non-flexed condition of said leaf spring coplanar with the latter.

4. The combination in a weighing device as set forth in claim 2, in which said leaf spring and action arm are a one-piece blank of resilient metal plate stock of uniform thickness, with said action arm being of sufficient width to have operational rigidity.

5. The combination in a weighing device as set forth in claim 2, in which said leaf spring is formed as two spaced parallel identical leaf parts and said action arm extends midway between said leaf parts.

6. The combination in a weighing device as set forth in claim 2, in which said load unit is connected with said action arm midway between the ends of said leaf spring, with said action arm also constituting one of said guiding members.

7. In a weighing device, the combination with a movable load unit and a stationary support, of a balancing spring unit having a plurality of longitudinal leaf springs each being of uniform width and thickness throughout and fixedly mounted with one end on said support and provided at its other end with an action arm, said leaf springs in non-flexed condition extending in first spaced parallel planes and being resiliently flexible in other planes, respectively, normal to said first planes, and said action arms being rigid and extending from said other ends of the respective leaf springs toward said one ends thereof; and spaced members guiding said load unit for movement substantially normal to said first planes, said load unit being solely supported by said action arms midway between the ends of the respective leaf springs, whereby said leaf springs will respond in compound S-like flexure to any weight on said load unit with the ensuing operational displacement of said action arms being proportional to said weight, and each action arm will in non-displaced and all operationally displaced conditions assume parallel dispositions.

8. The combination in weighing device as set forth in claim 7, in which said leaf springs are resiliently flexible in a common plane normal to said first planes, and said action arms constitute said guiding members.

9. The combination in a weighing device as set forth in claim 8, in which said leaf springs number two.

10. In a weighing device, the combination with a movable load unit and a stationary support, of a balancing spring unit having a longitudinal leaf spring fixedly mounted with one end on said support and provided at its other end with an action arm, of which said leaf spring is of uniform width and thickness throughout and in non-flexed condition extends in a first plane and is resiliently flexible in another plane normal to said first plane, and said action arm is rigid and extends from said other end of said leaf spring toward said one end thereof, said load unit being guided for movement substantially normal to said first plane and resting on said action arm midway between the ends of said leaf spring, and another spring acting on said action arm in line with but opposed to said load unit and normally urging said leaf spring into compound S-like flexure of a given magnitude to one side of said first plane to hold said load unit in zero-weight position, with said other spring resisting with increasing force recovery of said leaf spring to its non-flexed condition and redeflection of the same to the other side of said first plane under increasing load on said load unit, whereby load-induced deflection of equal magnitude of said leaf spring on said one and other side of said first plane denote smaller and larger weight increases, respectively; a fixed scale with weight-indicating graduations; and a pointer movable with said action arm and indicating on said graduations the weight of a load on said load unit.

11. The combination in a weighing device as set forth in claim 10, in which said other spring is arranged so that its deflection varies linearly with the force applied thereto.

12. In a weighing device, the combination with a movable load unit and a stationary support, of a guiding device for said load unit having two identical parallel longitudinal leaf springs side-by-side fixedly mounted at adjacent first ends thereof on said support and provided at their other adjacent ends with action arms, said leaf springs in non-flexed condition extending in first spaced parallel planes and being resiliently flexible in a common plane normal to said first planes, and said action arms being rigid and extending from said other ends of the respective leaf springs toward said first ends thereof, with said load unit being connected with said action arms midway between the ends of the respective leaf springs so that on movement of said load unit said leaf springs respond in compound S-like flexure and said action arms guide said load unit in a linear direction substantially normal to said first planes; and a spring acting on said load unit substantially to balance the latter under no load and all loads within a given range and being deflected in said linear direction under a load on said load unit, with the resiliency of said leaf springs being far in excess of that at which they alone would balance said load unit under no load or any load within said range.

References Cited by the Examiner

UNITED STATES PATENTS

| | | | |
|---|---|---|---|
| 1,159,416 | 11/15 | Powers | 177—229 |
| 2,646,274 | 7/53 | Weckerly | 177—229 |
| 2,649,294 | 8/53 | Walter | 177—229 |
| 2,697,595 | 12/54 | Walter | 177—229 |
| 3,023,822 | 3/62 | Knobel | 177—229 X |
| 3,047,084 | 7/62 | Vogel | 177—229 |
| 3,107,743 | 10/63 | Knobel | 177—229 X |

FOREIGN PATENTS 824,909  12/59  Great Britain.

LEO SMILOW, *Primary Examiner.*